US009619007B2

(12) United States Patent
Mizuno et al.

(10) Patent No.: US 9,619,007 B2
(45) Date of Patent: Apr. 11, 2017

(54) DRIVER IC OF A DISPLAY PANEL WAITING A PREDETERMINED TIME BEFORE SUPPLYING VERTICAL SYNCHRONIZATION SIGNAL (VSYNC) AFTER SLEEP-OUT COMMAND IS RECEIVED

(71) Applicant: Synaptics Japan GK, Tokyo (JP)

(72) Inventors: Toshio Mizuno, Tokyo (JP); Miho Kobayashi, Tokyo (JP); Junpei Sakurai, Tokyo (JP)

(73) Assignee: SYNAPTICS JAPAN GK, Tokyo (JP)

( * ) Notice: Subject to any disclaimer, the term of this patent is extended or adjusted under 35 U.S.C. 154(b) by 169 days.

(21) Appl. No.: 14/097,174

(22) Filed: Dec. 4, 2013

(65) Prior Publication Data
US 2014/0164806 A1    Jun. 12, 2014

(30) Foreign Application Priority Data

Dec. 7, 2012    (JP) .................................. 2012-268290

(51) Int. Cl.
*G06F 1/32*    (2006.01)
*G09G 3/36*    (2006.01)

(52) U.S. Cl.
CPC ......... *G06F 1/3265* (2013.01); *G09G 3/3696* (2013.01); *G09G 2330/02* (2013.01);
(Continued)

(58) Field of Classification Search
CPC .... G06F 1/3218; G06F 1/3265; G06F 1/3203; G09G 1/005
See application file for complete search history.

(56) References Cited

U.S. PATENT DOCUMENTS 5,398,138 A * 3/1995 Tomita ........................... 360/22
5,487,097 A * 1/1996 Hatakenaka et al. ........... 377/20
(Continued)

FOREIGN PATENT DOCUMENTS

JP    H07-271323 A    10/1995
JP    H09-68951 A    3/1997
(Continued)

OTHER PUBLICATIONS

Japanese Office Action dated Jul. 26, 2016, with a partial English translation.
(Continued)

*Primary Examiner* — Thomas Lee
*Assistant Examiner* — Santosh R Poudel
(74) *Attorney, Agent, or Firm* — McGinn IP Law Group, PLLC

(57) ABSTRACT

An integrated circuit device includes first and second integrated circuits and a power supply line. The first integrated circuit includes a first power supply circuit, a timing generation circuit generating a synchronization signal, and a first power supply control section. The second integrated circuit includes a second power supply circuit and a second power supply control section. The power supply line electrically connects the outputs of the first and second power supply circuit. The first and second power supply control sections are each configured to start the operations of the first and second power supply circuits, respectively, in response to a start of a supply of the synchronization signal after a sleep-out command is supplied thereto. The timing generation circuit starts supplying the synchronization signal after a predetermined waiting time elapses after the sleep-out command is supplied to the first integrated circuit.

11 Claims, 9 Drawing Sheets

(52) U.S. Cl.
CPC . *G09G 2330/022* (2013.01); *G09G 2330/025* (2013.01); *G09G 2330/026* (2013.01); *G09G 2330/027* (2013.01); *Y02B 60/1242* (2013.01); *Y02B 60/32* (2013.01)

(56) References Cited

U.S. PATENT DOCUMENTS

| | | | | |
|---|---|---|---|---|
| 5,491,495 | A * | 2/1996 | Ward et al. | 345/173 |
| 5,659,762 | A * | 8/1997 | Sawada et al. | 713/323 |
| 5,943,228 | A * | 8/1999 | Kim | 363/100 |
| 6,119,225 | A * | 9/2000 | Kim | 713/1 |
| 6,297,817 | B1 * | 10/2001 | Larson et al. | 345/213 |
| 6,498,629 | B1 * | 12/2002 | Carpentier | H04N 5/12 348/511 |
| 6,735,704 | B1 * | 5/2004 | Butka | H02J 1/10 307/86 |
| 6,848,055 | B1 * | 1/2005 | Yarch | 713/300 |
| 6,898,096 | B2 | 5/2005 | Endo et al. | |
| RE40,504 | E * | 9/2008 | Imamura | 345/211 |
| 7,669,063 | B2 * | 2/2010 | Cheng et al. | 713/300 |
| 8,819,472 | B1 * | 8/2014 | Muscha et al. | 713/400 |
| 8,935,556 | B2 * | 1/2015 | Kim et al. | 713/324 |
| 2003/0014675 | A1 * | 1/2003 | Lee | 713/310 |
| 2004/0085309 | A1 * | 5/2004 | Wang | H04N 5/12 345/213 |
| 2004/0230850 | A1 * | 11/2004 | Baumgartner et al. | 713/320 |
| 2005/0086552 | A1 * | 4/2005 | Matsubara | 713/340 |
| 2008/0043009 | A1 * | 2/2008 | Kim et al. | 345/211 |
| 2008/0055485 | A1 * | 3/2008 | Elnathan | H03L 7/06 348/723 |
| 2009/0140661 | A1 * | 6/2009 | Park et al. | 315/169.3 |
| 2009/0219238 | A1 * | 9/2009 | Furuya et al. | 345/87 |
| 2011/0004777 | A1 * | 1/2011 | Ogasawara | 713/323 |
| 2011/0128357 | A1 * | 6/2011 | Kim | 348/56 |
| 2011/0239028 | A1 * | 9/2011 | Higuma et al. | 713/340 |
| 2012/0182273 | A1 | 7/2012 | Ninomiya et al. | |
| 2012/0223748 | A1 * | 9/2012 | Habbley et al. | 327/141 |
| 2013/0169612 | A1 * | 7/2013 | Woo et al. | 345/211 |
| 2013/0335396 | A1 * | 12/2013 | Kim | 345/212 |
| 2014/0362042 | A1 * | 12/2014 | Noguchi et al. | 345/174 |

FOREIGN PATENT DOCUMENTS

| | | |
|---|---|---|
| JP | 2002-313925 A | 10/2002 |
| JP | 2003-099006 A | 4/2003 |
| JP | 2010-008953 A | 1/2010 |
| JP | 2012-037664 A | 2/2012 |
| JP | 2012-150152 A | 8/2012 |

OTHER PUBLICATIONS

Japanese Office Action dated Nov. 22, 2016, with a partial English translation.

* cited by examiner

US 9,619,007 B2

DRIVER IC OF A DISPLAY PANEL WAITING A PREDETERMINED TIME BEFORE SUPPLYING VERTICAL SYNCHRONIZATION SIGNAL (VSYNC) AFTER SLEEP-OUT COMMAND IS RECEIVED

CROSS REFERENCE

This application claims priority of Japanese Patent Application No. 2012-268290, filed on Dec. 7, 2012, the disclosure which is incorporated herein by reference.

TECHNICAL FIELD

The present invention relates to an integrated circuit device, an integrated circuit, a panel display device and a display panel driver, and more particularly relates to optimization of the activation procedure of power supply circuits in an integrated circuit device in which outputs of the power supply circuits integrated in integrated circuits are electrically connected to each other.

BACKGROUND ART

In an integrated circuit device which includes a plurality of integrated circuits, the difference in the power supply voltage level between the integrated circuits may cause a problem. To address this, the outputs of the power supply circuits integrated in the integrated circuits are often electrically connected to each other. In the case that a display panel (for example, a liquid crystal display panel) is driven by a plurality of driver ICs, for example, a difference may be generated between images displayed in the portions driven by the different driver ICs in the display panel, if the boosted power supply voltages generated by boosting power supplies of the driver ICs are different. One approach to solve this problem is to connect the outputs of the boosting power supplies in the driver ICs to a common power supply line for generating the same boosting power supply voltage in the plurality of driver ICs. The boosting power supply voltage thus generated is used to drive the display panel.

One possible problem is that, in the configuration in which the outputs of the power supply circuits integrated in the integrated circuits are electrically connected to each other, an overcurrent may be generated depending on the configurations and operations of the power supply circuits, when the plurality of power supply circuits are activated at different timings. Such a problem is the case with a configuration in which the outputs of the two power supply circuits are electrically connected to each other through the power supply line, each of the two power supply circuits having the output connected to ground when the operation thereof is stopped. More specifically, when one of the power supply circuits is already activated and the other of the power supply circuits is not activated yet, an overcurrent may flow to ground from the power supply line in the other power supply circuit. The generation of the overcurrent is desired to be avoided.

SUMMARY OF THE INVENTION

Therefore, an object of the present invention is to suppress generation of an overcurrent in an integrated circuit device in which the outputs of power supply circuits within integrated circuits are electrically connected to each other.

In an aspect of the present invention, an integrated circuit device includes first and second integrated circuits and a power supply line. The first integrated circuit includes: a first power supply circuit; a timing generation circuit generating a synchronization signal; and a first power supply control section controlling operation timing of the first power supply circuit. The second integrated circuit includes: a second power supply circuit; and a second power supply control section controlling operation timing of the second power supply circuit. The power supply line electrically connects outputs of the first and second power supply circuit. The first and second integrated circuits are adapted to a sleep mode. The operation of the first power supply circuit is stopped when the first integrated circuit is placed into the sleep mode and the operation of the second power supply circuit is stopped when the second integrated circuit is placed into the sleep mode. The synchronization signal is supplied to the first and second power supply control sections. The first power supply control section is configured to start the operation of the first power supply circuit in response to a start of a supply of the synchronization signal after a first sleep-out command to get out of the sleep mode is supplied to the first integrated circuit. The second power supply control section is configured to start the operation of the second power supply circuit in response to a start of a supply of the synchronization signal after a second sleep-out command to get out of the sleep mode is supplied to the second integrated circuit. The timing generation circuit starts supplying the synchronization signal after a predetermined waiting time elapses after the first sleep-out command is supplied to the first integrated circuit.

In one embodiment, the first power supply circuit includes a first output switch which connects the output of the first power supply circuit to a ground terminal when the operation of the first power supply circuit is stopped, and the second power supply circuit includes a second output switch which connects the output of the second power supply circuit to a ground terminal when the operation of the second power supply circuit is stopped.

In another aspect of the present invention, an integrated circuit is adapted to a sleep mode. The integrated circuit includes a power supply circuit, a timing generation circuit generating a synchronization signal, and a power supply control section controlling operation timing of the power supply circuit. The operation of the power supply circuit is stopped when the integrated circuit is placed into the sleep mode. The power supply control section is configured to start the operation of the power supply circuit in response to a start of a supply of the synchronization signal after a sleep-out command to get out of the sleep mode is supplied to the integrated circuit. The timing generation circuit starts supplying the synchronization signal after a predetermined waiting time elapses after the sleep-out command is supplied to the integrated circuit.

In still another aspect of the present invention, a panel display device includes a display panel, first and second drivers driving the display panel and a power supply line. The first driver includes a first power supply circuit, a timing generation circuit generating a vertical synchronization signal and a first power supply control section controlling operation timing of the first power supply circuit. The second driver includes a second power supply circuit and a second power supply control section controlling operation timing of the second power supply circuit. The power supply line electrically connects outputs of the first and second power supply circuits. The first and second drivers are adapted to a sleep mode. The operation of the first power supply circuit is stopped when the first driver is placed into the sleep mode, and the operation of the second power supply circuit is stopped when the second driver is placed into the sleep mode. The vertical synchronization signal is supplied to the first and second power supply control sections. The first power supply control section is configured to start the operation of the first power supply circuit in response to a start of a supply of the vertical synchronization signal after a first sleep-out command to get out of the sleep mode is supplied to the first driver. The second power supply control section is configured to start the operation of the second power supply circuit in response to a start of a supply of the vertical synchronization signal after a second sleep-out command to get out of the sleep mode is supplied to the second driver. The timing generation circuit starts supplying the synchronization signal after a predetermined waiting time elapses after the first sleep-out command is supplied to the first driver.

In one embodiment, the time duration of the predetermined waiting time is equal to or longer than the time duration of one frame period defined as a cycle period of the vertical synchronization signal.

In one embodiment, the first driver includes a first driving circuit operating on a first power supply voltage outputted from the first power supply circuit to drive the display panel, and the second driver includes a second driving circuit operating on a second power supply voltage outputted from the second power supply circuit to drive the display panel.

In still another aspect of the present invention, a display panel driver is configured to drive a display panel and adapted to a sleep mode. The display panel driver includes a power supply circuit, a timing generation circuit generating a vertical synchronization signal and a power supply control section controlling operation timing of the power supply circuit. The operation of the power supply circuit is stopped when the display panel driver is placed into the sleep mode. The vertical synchronization signal is supplied to the power supply control section. The power supply control section is configured to start the operation of the power supply circuit in response to a start of a supply of the vertical synchronization signal after a sleep-out command to get out of the sleep mode is supplied to the display panel driver. The timing generation circuit starts supplying the synchronization signal after a predetermined waiting time elapses after the sleep-out command is supplied to the display panel driver.

The present invention effectively suppresses generation of an overcurrent in an integrated circuit device in which the outputs of power supply circuits within integrated circuits are electrically connected to each other.

DESCRIPTION OF PREFERRED EMBODIMENTS

For easy understanding of a technical concept of the present invention, a description is first given of a problem which potentially occurs in the case when the outputs of power supply circuits integrated in multiple integrated circuits are electrically connected to each other.

Figure 1:
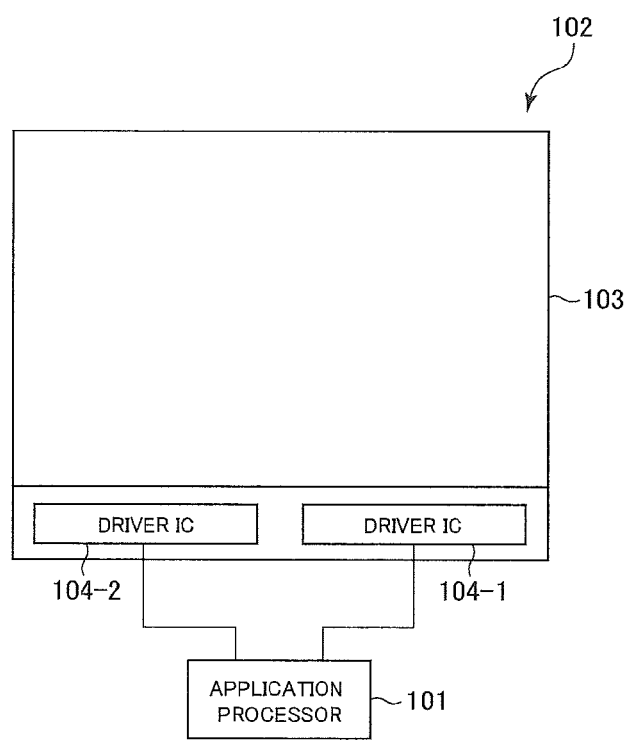
FIG. 1 is a block diagram illustrating an exemplary configuration of a liquid crystal display device, which is one example of an integrated circuit device which includes a plurality of integrated circuits where outputs of power supply circuits are electrically connected to each other.

FIG. 1 shows an example of an integrated circuit device which includes a plurality of integrated circuits where the outputs of power supply circuits are electrically connected to each other. The integrated circuit device illustrated in FIG. 1 is configured as a liquid crystal display device and includes an application processor 101, and an LCD panel 102 and two driver ICs 104-1 and 104-2. The application processor 101 supplies image data and control commands to the driver ICs 104-1 and 104-2. The driver ICs 104-1 and 104-2 drive the gate lines and data lines arranged in the display region 103 of the LCD panel 102 in response to the image data and control commands received from the application processor 101.

Figure 2:
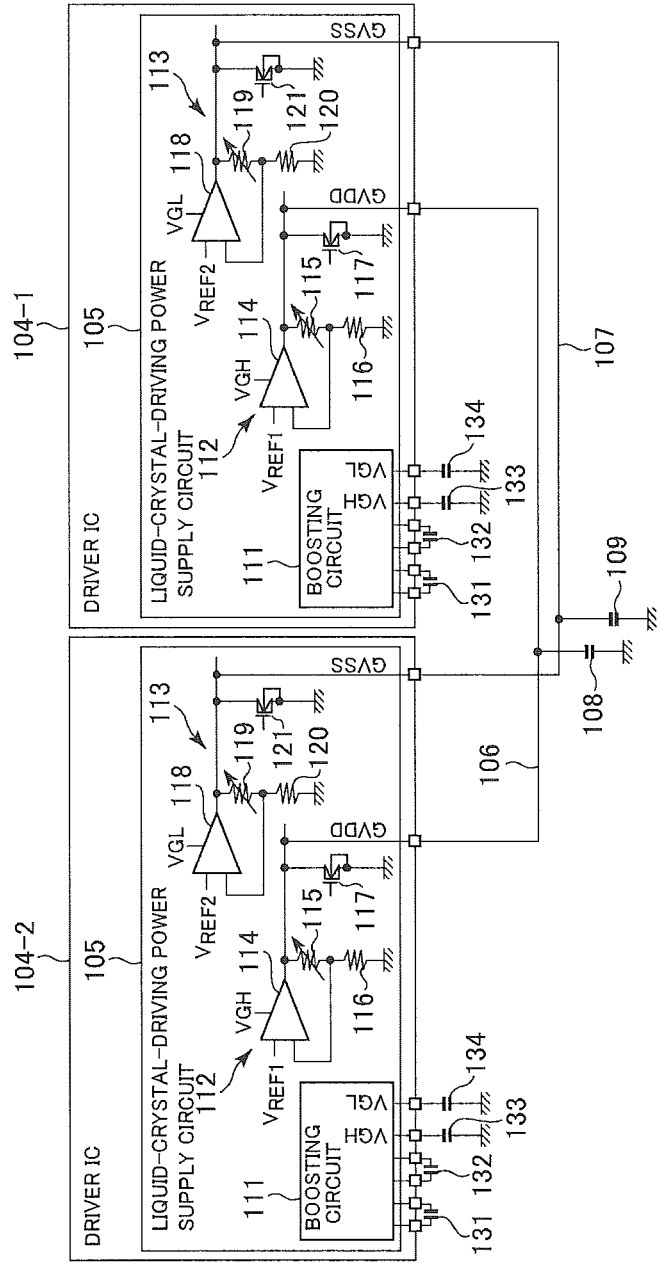
FIG. 2 is a circuit diagram illustrating an exemplary configuration of driver ICs of the liquid crystal display device in FIG. 1, especially, an exemplary configuration of a liquid-crystal-driving power supply circuit.

In such an integrated circuit device, the outputs of the power supply circuits integrated in the driver ICs 104-1 and 104-2 are often electrically connected to each other. FIG. 2 shows an example of the configuration of the driver ICs 104-1 and 104-2 thus configured. Each of the driver ICs 104-1 and 104-2 includes a liquid-crystal-driving power supply circuit 105. The liquid-crystal-driving power supply circuit 105 has the function of generating power supply voltages GVDD and GVSS. Here, the power supply voltages GVDD and GVSS are the voltages used as the "high" level and "low" level, respectively, in driving the gate lines of the LCD panel 102.

The liquid-crystal-driving power supply circuit 105 includes a boosting circuit 111, a GVDD generating circuit 112 and a GVSS generating circuit 113. The boosting circuit 111 boosts an inner power supply voltage by using externally-connected capacitors 131 to 134 to thereby generate voltages VGH and VGL. Here, the voltage VGL is a negative voltage.

The GVDD generating circuit 112 includes an amplifier 114, a variable resistor element 115, a resistor element 116 and an output switch 117. The amplifier 114 receives the voltage VGH and compares the voltage of the connection node between the variable resistor element 115 and the resistor element 116 with a referential voltage $V_{REF1}$. As a result, a power supply voltage GVDD is outputted from the output of the amplifier 114. The output switch 117 is connected between the output of the amplifier 114 and a ground terminal. Here, the outputs of the amplifiers 114 in the driver ICs 104-1 and 104-2, namely, the outputs of the GVDD generating circuits 112 are electrically connected to each other via a GVDD power supply line 106. A power supply capacitor 108 is connected to the GVDD power supply line 106.

Similarly, the GVSS generating circuit 113 includes an amplifier 118, a variable resistor element 119, a resistor element 120 and an output switch 121. The amplifier 118 receives the voltage VGL and compares the voltage of the connection node between the variable resistor element 119 and the resistor element 120 with a referential voltage $V_{REF2}$. As a result, a power supply voltage GVSS is outputted from an output of the amplifier 118. The output switch 121 is connected between the output of the amplifier 118 and the ground terminal. Here, the outputs of the amplifiers 118 in the driver ICs 104-1 and 104-2, namely, the outputs of the GVSS generating circuits 113 are electrically connected to each other via a GVSS power supply line 107. A power supply capacitor 109 is connected to the GVSS power supply line 107.

When the operations of the liquid-crystal-driving power supply circuits 105 of both of the driver ICs 104-1 and 104-2 are stopped (for example, when the driver ICs 104-1 and 104-2 are placed into a sleep mode), the boosting circuits 111 are stopped and the outputs of the amplifiers 114 and 118 are set to a Hi-Z (high impedance) state. In addition, the output switches 117 and 121 are turned on in both of the driver ICs 104-1 and 104-2, and thereby the GVDD power supply line 106 and the GVSS power supply line 107 are grounded. Such operations are intended to avoid the potentials of the GVDD power supply line 106 and the GVSS power supply line 107 being varied when the operations of the liquid-crystal-driving power supply circuits 105 are stopped.

Figure 3:
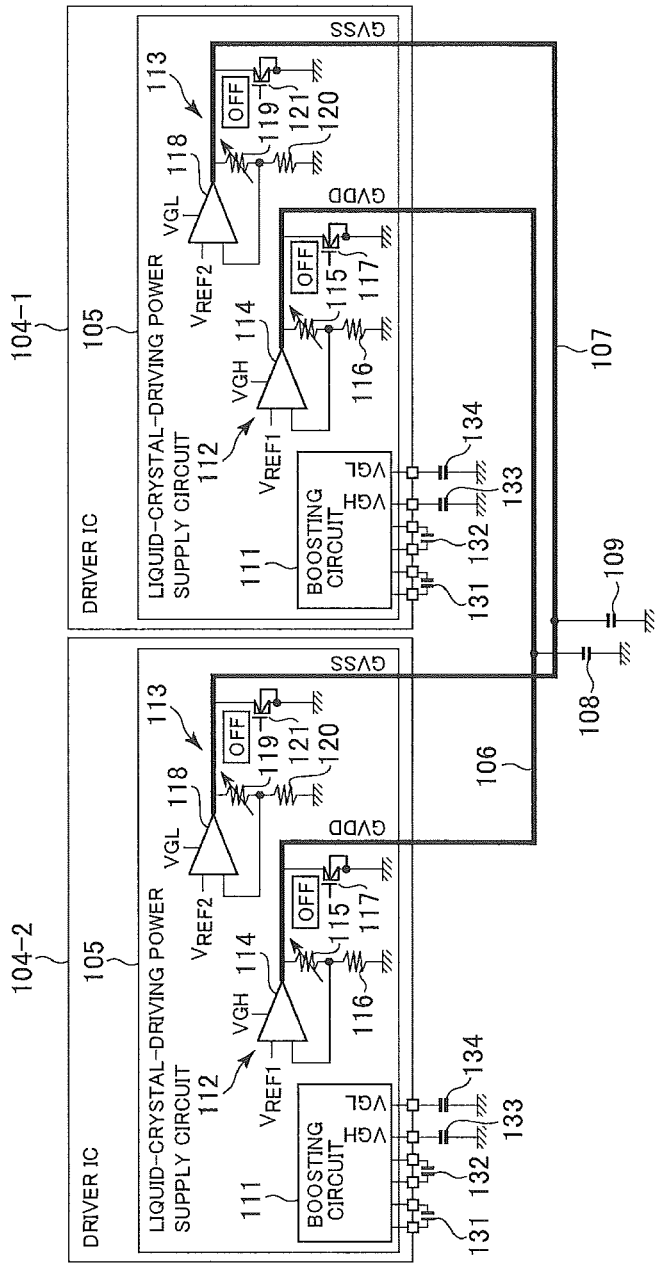
FIG. 3 is a circuit diagram illustrating the state of the driver ICs in FIG. 2 when the liquid-crystal-driving power supply circuit is in operation.

On the other hand, when the liquid-crystal-driving power supply circuits 105 of the driver ICs 104-1 and 104-2 are both in operation, as illustrated in FIG. 3, the boosting circuits 111 supply the voltages VGH and VGL to the amplifiers 114 and 118. In addition, the amplifiers 114 and 118 are operated on the voltages VGH and VGL to output the power supply voltages GVDD and GVSS. The power supply voltage GVDD is generated on the GVDD power supply line 106, and the power supply voltage GVSS is generated on the GVSS power supply line 107. In this operation, the output switches 117 and 121 are turned off.

Figure 4:
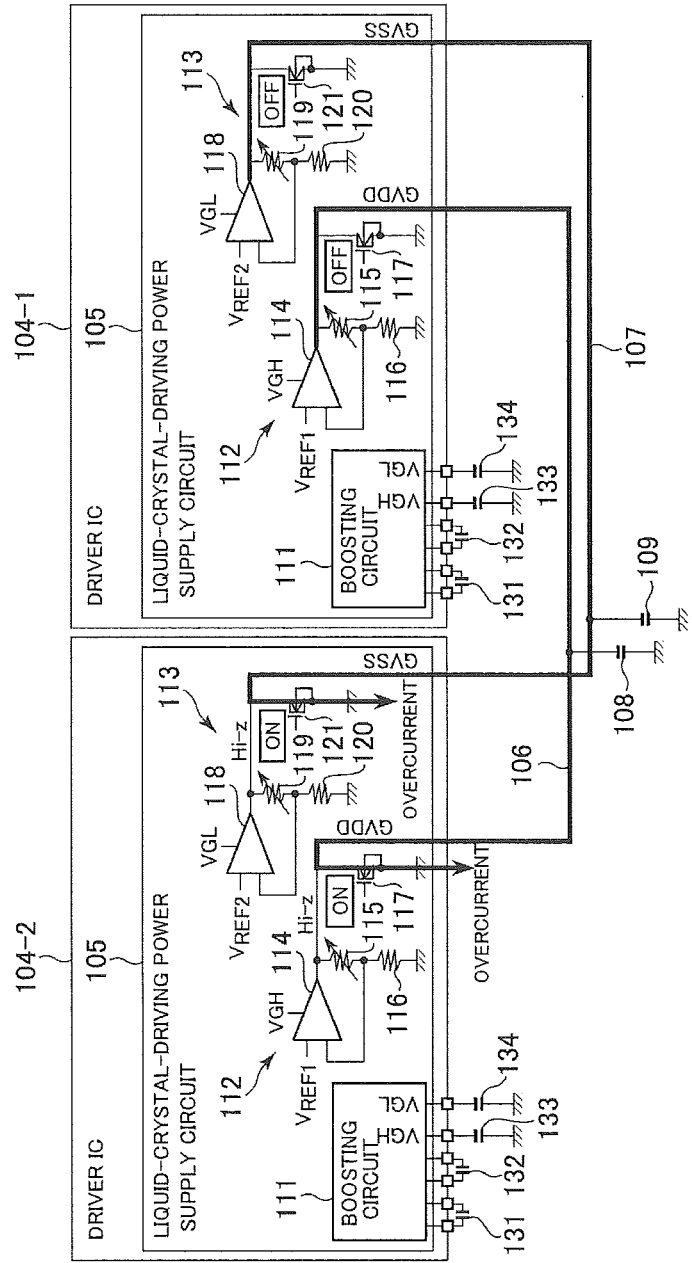
FIG. 4 is a circuit diagram illustrating a generation of an overcurrent in the driver ICs in FIG. 2, in the case when the liquid-crystal-driving power supply circuit in one driver IC is activated and the liquid-crystal-driving power supply circuit in the other driver IC is not activated yet.

In the following, a consideration is given of the case when the liquid-crystal-driving power supply circuit 105 in the driver IC 104-1 is activated earlier than the liquid-crystal-driving power supply circuit 105 in the driver IC 104-2 in the integrated circuit device thus configured. In this case, as illustrated in FIG. 4, the power supply voltages GVDD and GVSS are outputted by the GVDD generating circuit 112 and the GVSS generating circuit 113 in the driver IC 104-1, respectively. On the other hand, the output switches 117 and 121 are kept turned on in the GVDD generating circuit 112 and the GVSS generating circuit 113 in the driver IC 104-2. This results in formation of the routes through which currents flow from the GVDD generating circuit 112 and the GVSS generating circuit 113 to the ground terminal in the driver IC 104-1, which causes generation of overcurrents.

The situation in which the liquid-crystal-driving power supply circuit 105 in the driver IC 104-1 is activated earlier than the liquid-crystal-driving power supply circuit 105 in the driver IC 104-2 may occur, for example, when the liquid crystal display device is configured such that the driver ICs 104-1 and 104-2 are controlled by commands issued by the application processor 101. In a system configuration in which the driver ICs 104-1 and 104-2 are configured to get out of the sleep mode when receiving sleep-out commands (that is, commands to get out of the sleep mode) from the application processor 101, the timings when the sleep-out commands are supplied to the driver ICs 104-1 and 104-2 may be different due to the influence of an interruption in the application processor 101 or the like. Such situation may occur, for example, when the driver ICs 104-1 and 104-2 are connected to the application processor 101 by communications based on the MIPI-DSI standard (note that, a conventional technique in which data are transferred by communications based on the MIPI-DSI standard from a processor (host device) to a plurality of devices is disclosed in, for example, JP 2012-150152A). In this case, the timings when the activation procedures of the liquid-crystal-driving power supply circuits 105 are started in the driver ICs 104-1 and 104-2 may be different during the process of getting out of the sleep mode.

Figure 5:
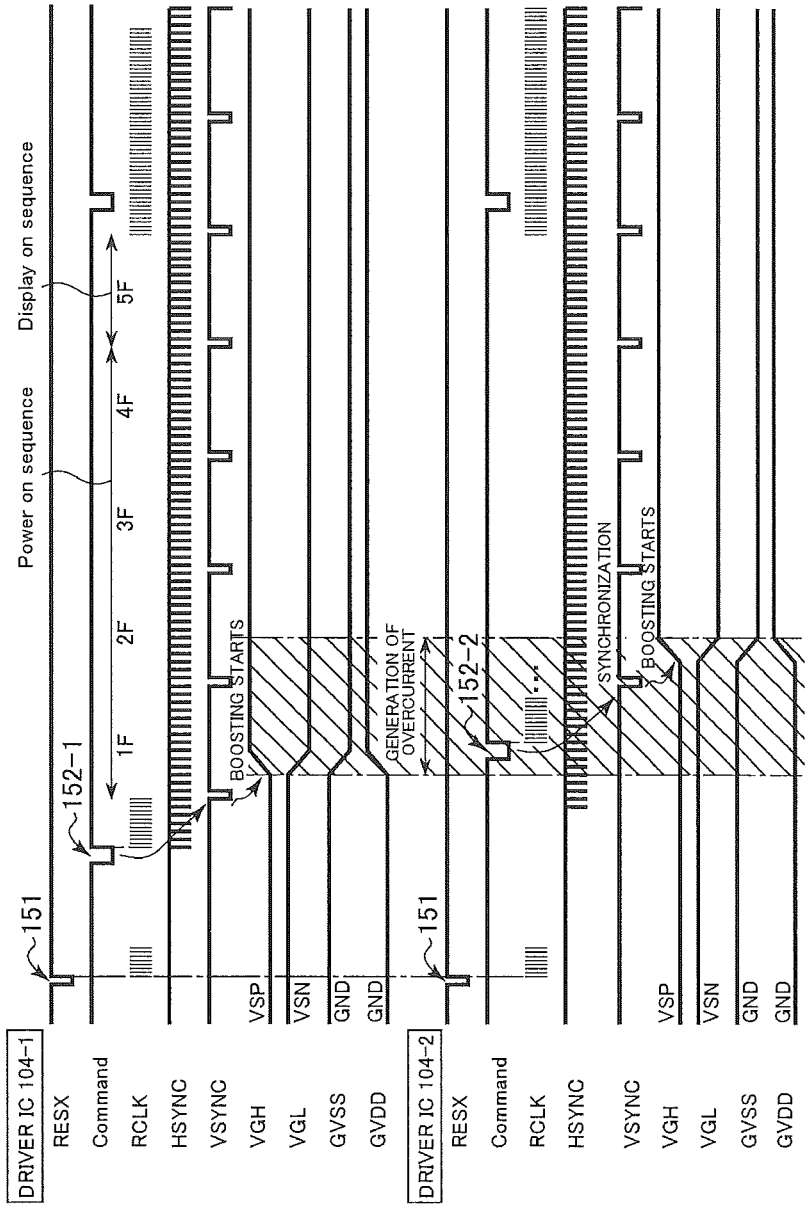
FIG. 5 is a timing chart illustrating an operational sequence of the liquid crystal display device illustrated in FIGS. 1 and 2 in the case when the two driver ICs get out of the sleep mode.

FIG. 5 shows an example of the sequence in which the driver ICs 104-1 and 104-2 get out of the sleep mode. In this example, it is assumed that, when each of the driver ICs 104-1 and 104-2 receive a command to get out of the sleep mode (that is, a sleep-out command), supplies of a referential clock signal RCLK, a horizontal synchronization signal HSYNC and a vertical synchronization signal VSYNC are started within each of the driver ICs 104-1 and 104-2, and an activation of the liquid-crystal-driving power supply circuit 105 is started in synchronization with the first pulse of the vertical synchronization signal VSYNC.

First, a reset pulse 151 is supplied to the driver ICs 104-1 and 104-2 over a reset signal RESX. This is followed by supplying sleep-out commands 152-1 and 152-2 to the driver ICs 104-1 and 104-2, respectively. Here, a consideration is given of the case when the sleep-out command 152-2 is supplied later than the sleep-out command 152-1. In this case, if the sleep-out command 152-2 is supplied to the driver IC 104-2 after the generation of the first pulse of the vertical synchronization signal VSYNC in the driver IC 104-1, the liquid-crystal-driving power supply circuit 105 in the driver IC 104-1 is activated earlier than the liquid-crystal-driving power supply circuit 105 in the driver IC 104-2. As discussed above, when the liquid-crystal-driving power supply circuit 105 in the driver IC 104-1 is activated earlier than the liquid-crystal-driving power supply circuit 105 in the driver IC 104-2, the routes through which the currents flow from the GVDD generating circuit 112 and the GVSS generating circuit 113 to the ground terminal in the driver IC 104-1 are formed. This results in generation of overcurrents.

In embodiments of the present invention described below, a technical approach is provided which suppresses the generation of an overcurrent in an integrated circuit device in which the outputs of power supply circuits integrated in a plurality of integrated circuits are electrically connected to each other.

Figure 6:
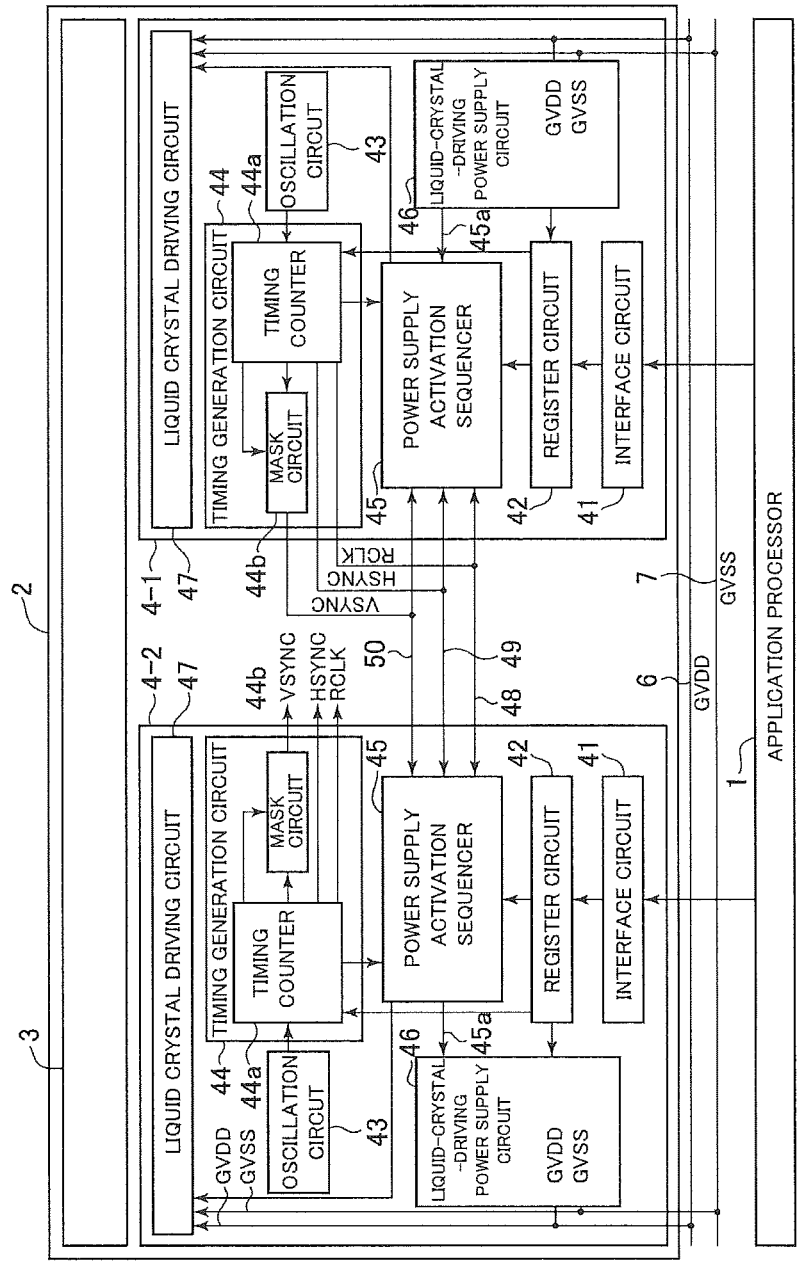
FIG. 6 is a block diagram illustrating exemplary configurations of a liquid crystal display device, which operates as an integrated circuit device in one embodiment of the present invention and the driver ICs installed in the liquid crystal display device.

FIG. 6 is the block diagram illustrating an exemplary configuration of an integrated circuit device in one embodiment of the present invention. The integrated circuit device in FIG. 6 is configured as a liquid crystal display device and includes an application processor 1, an LCD panel 2 and driver ICs 4-1 and 4-2. The application processor 1 supplies image data and control commands to the driver ICs 4-1 and 4-2. The driver ICs 4-1 and 4-2 drive the gate lines and data lines of a display region 3 in the LCD panel 2 in response to the image data and control commands received from the application processor 1.

In this embodiment, the driver ICs 4-1 and 4-2 are configured with the same configuration. The driver ICs 4-1 and 4-2 each include an interface circuit 41, a register circuit 42, an oscillation circuit 43, a timing generation circuit 44, a power supply activation sequencer 45, a liquid-crystal-driving power supply circuit 46 and a liquid crystal driving circuit 47.

The interface circuit 41 receives commands from the driver ICs 4-1 and 4-2 and transfers the received commands to the register circuit 42. The register circuit 42 stores the received commands and further transfers the commands to the timing generation circuit 44, the power supply activation sequencer 45 and the liquid-crystal-driving power supply circuit 46. The oscillation circuit 43 generates a clock signal used for generation of a referential clock signal RCLK, a horizontal synchronization signal HSYNC and the vertical synchronization signal VSYNC.

The timing generation circuit 44 generates the referential clock signal RCLK, the horizontal synchronization signal HSYNC and the vertical synchronization signal VSYNC from the clock signal supplied by the oscillation circuit 43. Here, as is known to the person skilled in the art, the horizontal synchronization signal HSYNC defines the horizontal synchronization period, and the vertical synchronization signal VSYNC defines the frame period (or the vertical synchronization period). In detail, the timing generation circuit 44 includes a timing counter 44a and a mask circuit 44b. The timing counter 44a counts the pulses of the clock signal supplied from the oscillation circuit 43 to consequently generate the referential clock signal RCLK and the horizontal synchronization signal HSYNC. The mask circuit 44b masks a part of a waveform of the horizontal synchronization signal HSYNC to consequently generate the vertical synchronization signal VSYNC.

The power supply activation sequencer 45 is responsive to commands received from the register circuit 42, the referential clock signal RCLK, the horizontal synchronization signal HSYNC and the vertical synchronization signal VSYNC for generating a timing control signal 45a which controls the operation timing of the liquid-crystal-driving power supply circuit 46. In this embodiment, the power supply activation sequencer 45 is configured to start the activation of the liquid-crystal-driving power supply circuit 46 in synchronization with the start of the supply of the vertical synchronization signal VSYNC (that is, in synchronization with the first pulse) after receiving a sleep-out command from the register circuit 42.

The liquid-crystal-driving power supply circuit 46 generates various power supply voltages used in the driver ICs 4-1 or 4-2. The power supply voltages generated by the liquid-crystal-driving power supply circuit 46 include the power supply voltages GVDD and GVSS used in the liquid crystal driving circuit 47. Here, the power supply voltages GVDD and GVSS are the voltages used as the "high" level and the "low" level, respectively, in driving the gate lines of the LCD panel 2. The power supply voltage GVSS is a negative voltage.

The liquid crystal driving circuit 47 drives the data lines and gate lines of the LCD panel 2. In this embodiment, the liquid crystal driving circuit 47 uses the power supply voltages GVDD and GVSS when driving the gate lines. When a certain gate line is selected (that is, when pixels connected to the gate line are driven), the selected gate line is pulled up to the power supply voltage GVDD. On the other hand, unselected gate lines are pulled down to the power supply voltage GVSS.

In this embodiment, one of the driver ICs 4-1 and 4-2 is used as a master driver which supplies the referential clock signal RCLK, the horizontal synchronization signal HSYNC and the vertical synchronization signal VSYNC, and the other is operated as a slave driver which operates in synchronization with the referential clock signal RCLK, the horizontal synchronization signal HSYNC and the vertical synchronization signal VSYNC, which are supplied from the master driver. FIG. 6 illustrates the configurations in the case when the driver IC 4-1 is operated as the master driver, and the driver IC 4-2 is operated as the slave driver. The referential clock signal RCLK, the horizontal synchronization signal HSYNC and the vertical synchronization signal VSYNC, which are generated by the driver IC 4-1 operating as the master driver, are supplied to an RCLK line 48, an HSYNC line 49 and a VSYNC line 50, respectively. The RCLK line 48, the HSYNC line 49 and the VSYNC line 50 are connected to the inputs of the power supply activation sequencers 45 in the driver ICs 4-1 and 4-2 and the referential clock signal RCLK, the horizontal synchronization signal HSYNC and the vertical synchronization signal VSYNC are supplied to the power supply activation sequencers 45 in the driver ICs 4-1 and 4-2 via the RCLK line 48, the HSYNC line 49 and the VSYNC line 50. The power supply activation sequencers 45 controls the operational timings of the liquid-crystal-driving power supply circuits 46 in response to the referential clock signal RCLK, the horizontal synchronization signal HSYNC and the vertical synchronization signal VSYNC.

Figure 7:
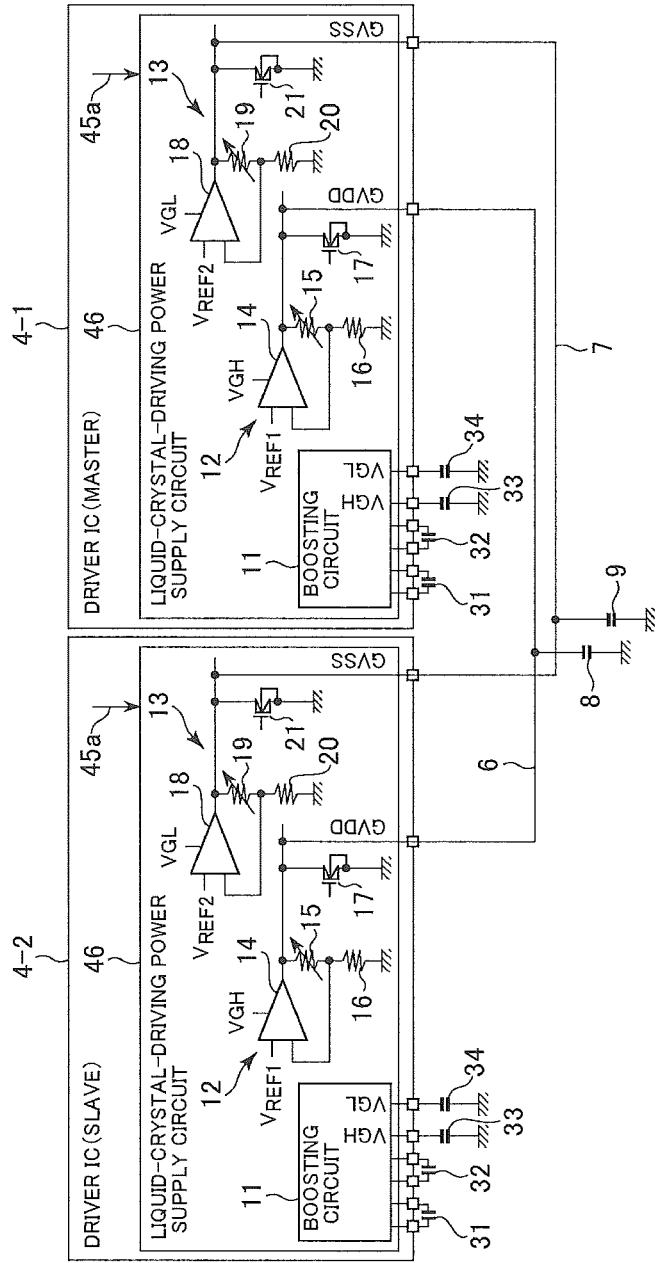
FIG. 7 is a circuit diagram illustrating an exemplary configuration of the liquid-crystal-driving power supply circuit integrated in the driver IC illustrated in FIG. 6.

FIG. 7 is a circuit diagram illustrating an exemplary configuration of the liquid-crystal-driving power supply circuit 46 integrated in each of the driver ICs 4-1 and 4-2. The configuration of the liquid-crystal-driving power supply circuit 46 is similar to the configuration of the liquid-crystal-driving power supply circuit 105 illustrated in FIG. 2 and includes a boosting circuit 11, a GVDD generating circuit 12 and a GVSS generating circuit 13. The boosting circuit 11 boosts an inner power supply voltage by using externally-connected capacitors 31 to 34 to generate the voltages VGH and VGL. Here, the voltage VGL is a negative voltage.

The GVDD generating circuit 12 includes an amplifier 14, a variable resistor element 15, a resistor element 16 and an output switch 17. The voltage VGH generated by the boosting circuit 11 is supplied to the power supply terminal of the amplifier 14 and the amplifier 14 is operated on the voltage VGH. The referential voltage $V_{REF1}$ is supplied to one input of the amplifier 14, and the connection node between the variable resistor element 15 and the resistor element 16 is connected to the other input. The amplifier 14 compares the voltage on the connection node between the variable resistor element 15 and the resistor element 16 with the referential voltage $V_{REF1}$ and outputs the power supply voltage GVDD from the output thereof. The output switch 17 is connected between the output of the amplifier 14 and the ground terminal. The output switch 17 is turned off when the liquid-crystal-driving power supply circuit 46 is in operation, and turned on when the operation of the liquid-crystal-driving power supply circuit 46 is stopped.

The outputs of the GVDD generating circuits 12 in the driver ICs 4-1 and 4-2, that is, the outputs of the amplifiers 14 are electrically connected to each other via a GVDD power supply line 6. A power supply capacitor 8 is connected to the GVDD power supply line 6.

Similarly, the GVSS generating circuit 13 includes an amplifier 18, a variable resistor element 19, a resistor element 20 and an output switch 21. The voltage VGL generated by the boosting circuit 11 is supplied to the power supply terminal of the amplifier 18 and the amplifier 18 is operated on the voltage VGL. The referential voltage $V_{REF2}$ is supplied to one input of the amplifier 18, and the connection node between the variable resistor element 19 and the resistor element 20 is connected to the other input. The amplifier 18 compares the voltage on the connection node between the variable resistor element 19 and the resistor element 20 with the referential voltage $V_{REF2}$ and outputs the power supply voltage GVSS from the output thereof. The output switch 21 is connected between the output of the amplifier 18 and the ground terminal. The output switch 21 is turned off when the liquid-crystal-driving power supply circuit 46 is in operation, and turned on when the operation of the liquid-crystal-driving power supply circuit 46 is stopped.

The outputs of the GVSS generating circuits 13 in the driver ICs 4-1 and 4-2, that is, the outputs of the amplifiers 18 are electrically connected to each other via a GVSS power supply line 7. A power supply capacitor 9 is connected to the GVSS power supply line 7.

In the following, a description is given of exemplary operations of the driver ICs 4-1 and 4-2 in this embodiment. In this embodiment, the driver ICs 4-1 and 4-2 are both adapted to a sleep mode. When the driver ICs 4-1 and 4-2 are placed into the sleep mode, only minimum circuits are operated in the driver ICs 4-1 and 4-2. In detail, when the driver ICs 4-1 and 4-2 are placed into the sleep mode, the operations of the timing generation circuit 44, the liquid-crystal-driving power supply circuit 46 and the liquid crystal driving circuit 47 are stopped, and only the interface circuit 41, the register circuit 42, the oscillation circuit 43 and the power supply activation sequencer 45 are placed into operation.

When sleep-out commands are supplied to the driver ICs 4-1 and 4-2 while the driver ICs 4-1 and 4-2 are set to the sleep mode, the driver ICs 4-1 and 4-2 operate to get out of the sleep mode. In detail, when the sleep-out command is supplied, the timing generation circuit 44 in the driver IC 4-1, which operates as the master driver, starts supplying the referential clock signal RCLK and the horizontal synchronization signal HSYNC. As mentioned above, the referential clock signal RCLK and the horizontal synchronization signal HSYNC, which are generated by the driver IC 4-1 operating as the master driver, are supplied to the power supply activation sequencers 45 in both of the driver ICs 4-1 and 4-2.

After an elapse of a sufficiently long waiting time from the supply of the sleep-out command, the timing generation circuit 44 in the driver IC driver IC 4-1, which operates as the master driver, starts supplying the vertical synchronization signal VSYNC. The waiting time from the supply of the sleep-out command to the start of the supply of the vertical synchronization signal VSYNC is set sufficiently longer than the possible difference between the timings when the sleep-out commands are supplied to the driver ICs 4-1 and 4-2, respectively. In one embodiment, the waiting time from the supply of the sleep-out command to the start of the supply of the vertical synchronization signal VSYNC is set to one frame period (that is, one cycle period of the vertical synchronization signal VSYNC) or more. In this case, the period corresponding to one frame period is reserved as a power supply activation adjustment period after the sleep-out command is received. Then, the supply of the vertical synchronization signal VSYNC is started after the power supply activation adjustment period elapses.

After the sleep-out commands are supplied, the power supply activation sequencers 45 in both of the driver ICs 4-1 and 4-2 activate the liquid-crystal-driving power supply circuits 46 in synchronization with the pulse that firstly appears in the vertical synchronization signal VSYNC. When the activation of the liquid-crystal-driving power supply circuit 46 is started, the output switches 17 and 21 are switched from the on-state to the off-state. Moreover, the boosting operation of the boosting circuit 11 is started, and the voltages VGH and VGL start to be supplied to the amplifiers 14 and 18, respectively. The amplifiers 14 and 18 receive the voltages VGH and VGL and starts outputting the power supply voltages GVDD and GVSS, respectively.

The above-described operation effectively suppresses generation of an overcurrent even if the timings when the sleep-out commands are supplied to the driver ICs 4-1 and 4-2, respectively, are different; in the above-described operation, the activations of the liquid-crystal-driving power supply circuits 46 in the driver ICs 4-1 and 4-2 are started at close timings.

Figure 8:
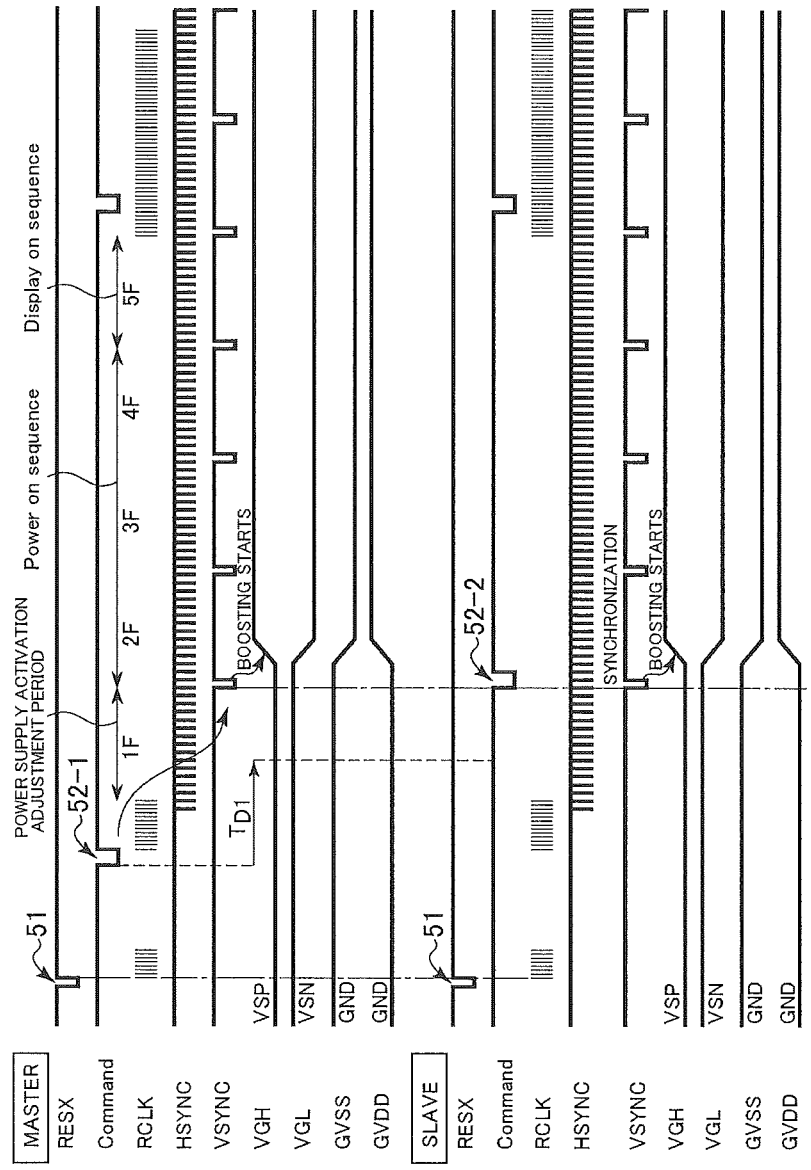
FIG. 8 is a timing chart illustrating exemplary operations of the respective driver ICs in the case when the timing when a sleep-out command is supplied to a master driver is earlier than the timing when a sleep-out command is supplied to a slave driver.

First, FIG. 8 is a timing chart illustrating the operations of the driver ICs 4-1 and 4-2 in the case when the timing when the sleep-out command is supplied to the driver IC 4-2, which operates as the slave driver, is later by a delay time $T_{D1}$ than the timing when the sleep-out command is supplied to the driver IC 4-1, which operates as the master driver.

A reset pulse 51 is first supplied to the driver ICs 4-1 and 4-2 over the reset signal RESX. When a sleep-out command 52-1 is then supplied to the driver IC 4-1, which operates as the master driver, the timing generation circuit 44 in the driver IC 4-1 starts supplying the referential clock signal RCLK and then starts supplying the horizontal synchronization signal HSYNC. The referential clock signal RCLK and the horizontal synchronization signal HSYNC, which are generated by the timing generation circuit 44 in the driver IC 4-1, are supplied to the power supply activation sequencers 45 in both of the driver ICs 4-1 and 4-2.

Subsequently, after an elapse of a sufficient waiting time, that is, after an elapse of the power supply activation adjustment period which starts after the driver IC 4-1 receives the sleep-out command 52-1, the timing generation circuit 44 in the driver IC 4-1 starts supplying the vertical synchronization signal VSYNC. In FIG. 8, the power supply activation adjustment period is denoted by the symbol "1F". Note that the power supply activation adjustment period has a time duration corresponding to one frame period. The vertical synchronization signal VSYNC generated by the timing generation circuit 44 in the driver IC 4-1 is supplied to the power supply activation sequencers 45 in both of the driver ICs 4-1 and 4-2. The power supply activation sequencer 45 in the driver IC 4-1 starts activation of the liquid-crystal-driving power supply circuit 46 in response to the first pulse of the vertical synchronization signal VSYNC.

Is should be noted that, when the waiting time from the supply of the sleep-out command 52-1 to the driver IC 4-1 to the start of the supply of the vertical synchronization signal VSYNC is sufficiently long, the sleep-out command 52-2 is supplied to the driver IC 4-2 before the supply of the vertical synchronization signal VSYNC is started. In this case, the power supply activation sequencer 45 in the driver IC 4-2 also starts activation of the liquid-crystal-driving power supply circuit 46 in response to the first pulse of the vertical synchronization signal VSYNC. Accordingly, the power supply activation sequencers 45 in the driver ICs 4-1 and 4-2 start the activations of the liquid-crystal-driving power supply circuits 46 at close timings. Hence, no overcurrent is generated in the liquid-crystal-driving power supply circuits 46 in the driver ICs 4-1 and 4-2.

When the waiting time until the start of the supply of the vertical synchronization signal VSYNC is set to a time duration of one frame period or more, for example, the generation of the overcurrent can be suppressed even if the assumable difference between the timings when the sleep-out commands are respectively supplied to the driver ICs 4-1 and 4-2 is half of the time duration of one frame period or less. This is a sufficient assumption in practical utilization.

Figure 9:
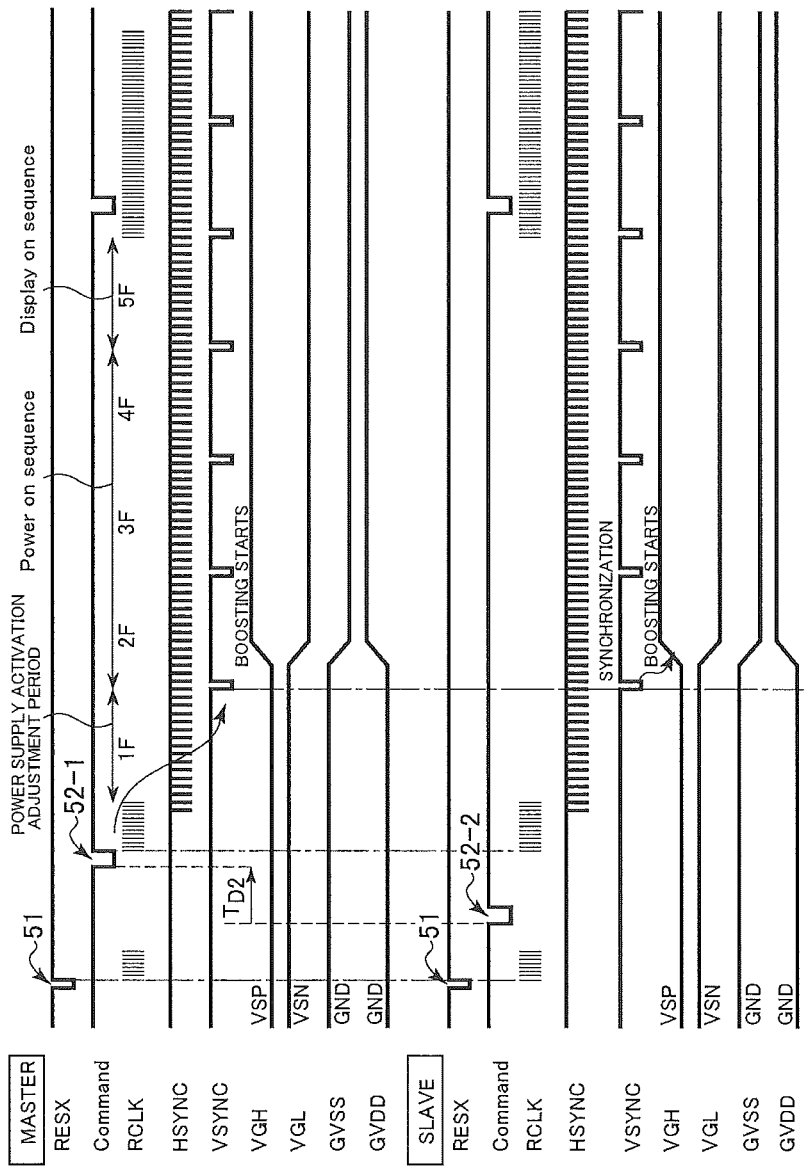
FIG. 9 is a timing chart illustrating exemplary operations of the respective driver ICs in the case when the timing when the sleep-out command is supplied to the master driver is later than the timing when the sleep-out command is supplied to the slave driver.

FIG. 9 is, on the other hand, a timing chart illustrating the operations of the driver ICs 4-1 and 4-2 in the case when the timing when the sleep-out command is supplied to the driver IC 4-1, which operates as the master driver, is later by a delay time $T_{D2}$ than the timing when the sleep-out command is supplied to the driver IC 4-2, which operates as the slave driver.

In this case, after the reset pulse 51 is supplied to the driver ICs 4-1 and 4-2 over the reset signal RESX, the sleep-out command 52-2 is supplied to the driver IC 4-2, which operates as the slaver driver. At this stage, the referential clock signal RCLK, the horizontal synchronization signal HSYNC and the vertical synchronization signal VSYNC are not supplied to the driver IC 4-2 yet. Thus, the driver IC 4-2 does not operate.

When the sleep-out command 52-2 is then supplied to the driver IC 4-1, which operates as the master driver, the timing generation circuit 44 in the driver IC 4-1 starts supplying the referential clock signal RCLK and then starts supplying the horizontal synchronization signal HSYNC. The referential clock signal RCLK and the horizontal synchronization signal HSYNC, which are generated by the timing generation circuit 44 in the driver IC 4-1, are supplied to the power supply activation sequencers 45 in both of the driver ICs 4-1 and 4-2.

After the elapse of the sufficient waiting time, that is, after the elapse of the power supply activation adjustment period which starts after the driver IC 4-1 receives the sleep-out command 52-1, the timing generation circuit 44 in the driver IC 4-1 then starts supplying the vertical synchronization signal VSYNC. The vertical synchronization signal VSYNC generated by the timing generation circuit 44 in the driver IC 4-1 is supplied to the power supply activation sequencers 45 in both of the driver ICs 4-1 and 4-2. The power supply activation sequencers 45 in both of the driver ICs 4-1 and 4-2 start activations of the liquid-crystal-driving power supply circuits 46 in response to the first pulse of the vertical synchronization signal VSYNC. As a result, the power supply activation sequencers 45 in the driver ICs 4-1 and 4-2 start activations the liquid-crystal-driving power supply circuits 46 at close timings. Accordingly, no overcurrent is generated in the liquid-crystal-driving power supply circuits 46 in the driver ICs 4-1 and 4-2.

As discussed above, in this embodiment, the power supply activation sequencers 45 in both of the driver ICs 4-1 and 4-2, start activations of the liquid-crystal-driving power supply circuits 46 after receiving the sleep-out commands, in synchronization with the start of the supply of the vertical synchronization signal VSYNC (that is, in synchronization with the first pulse). In this operation, the vertical synchronization signal VSYNC is supplied from the timing generation circuit 44 in the driver IC 4-1, which operates as the master driver, to the power supply activation sequencers 45 in both of the driver ICs 4-1 and 4-2. In addition, the timing generation circuit 44 in the driver IC 4-1 is configured to start supplying the vertical synchronization signal VSYNC, after the elapse of the sufficient long waiting time from the reception of the sleep-out command.

Such configuration allows the liquid crystal display device in this embodiment to start activations of the liquid-crystal-driving power supply circuits 46 in the driver ICs 4-1 and 4-2 at close timings, even if the timings when the sleep-out command are supplied to the driver ICs 4-1 and 4-2, respectively, are different. This effectively suppresses generation of an overcurrent.

Although embodiments of the present invention are specifically described in the above, the present invention should not be construed limitedly to the above-mentioned embodiments. It would be apparent to the person skilled in the art that the present invention may be implemented together with various modifications.

For example, although the liquid crystal display device is described as including the two driver ICs 4-1 and 4-2 in the above-described embodiments, the number of the driver ICs may be three or more. In this case, one of the plurality of driver ICs is operated as the master driver, and the remaining driver ICs are operated as the slave drivers.

Also, the present invention is not limited to the liquid crystal display device that includes the LCD panel 2; the present invention may be generally applicable to panel display devices which include a display panel.

It should be further noted that the present invention may be generally applicable to integrated circuit devices that include a plurality of integrated circuits in which the outputs of power supply circuits integrated therein are electrically connected to each other. In this case, one of the plurality of integrated circuits is selected as a master device, and the remaining integrated circuits operate as slave devices. Power supply activation sequencers in the respective integrated circuits are configured to start activations of the power supply circuits in synchronization with the start of the supply of a synchronization signal (that is, in synchronization with the first pulse of the synchronization signal), after receiving a sleep-out command. Here, the synchronization signal is supplied from the master device to the power supply activation sequencers in all of the integrated circuits. Also, a timing generation circuit in the master device is configured to start supplying the synchronization signal, after the elapse of a sufficiently long waiting time, after the supply of the sleep-out command.

What is claimed is:

1. An integrated circuit device, comprising:
   a first integrated circuit including:
      a first power supply circuit;
      a timing generation circuit generating a vertical synchronization signal defining each vertical synchronization period; and
      a first power supply control section controlling operation timing of said first power supply circuit;
   a second integrated circuit including:
      a second power supply circuit; and
      a second power supply control section controlling operation timing of said second power supply circuit; and
   a power supply line electrically connecting outputs of said first and second power supply circuits,
   wherein said first and second integrated circuits are adapted to a sleep mode, wherein an operation of said first power supply circuit is stopped when said first integrated circuit is placed into the sleep mode, wherein an operation of said second power supply circuit is stopped when said second integrated circuit is placed into the sleep mode, wherein said vertical synchronization signal is supplied to said first and second power supply control sections, wherein said first power supply control section is configured to start the operation of said first power supply circuit in response to a start of a supply of said vertical synchronization signal after a first sleep-out command to get out of the sleep mode is supplied to said first integrated circuit, wherein said second power supply control section is configured to start the operation of said second power supply circuit in response to a start of a supply of said vertical synchronization signal after a second sleep-out command to get out of the sleep mode is supplied to said second integrated circuit, and wherein said timing generation circuit starts supplying said vertical synchronization signal after a predetermined waiting time elapses after said first sleep-out command is supplied to said first integrated circuit.

2. The integrated circuit device according to claim 1, wherein said first power supply circuit includes a first output switch which connects the output of said first power supply circuit to a ground terminal when the operation of said first power supply circuit is stopped, and wherein said second power supply circuit includes a second output switch which connects the output of said second power supply circuit to a ground terminal when the operation of said second power supply circuit is stopped.

3. The integrated circuit device according to claim 1, further comprising a host which supplies the first sleep-out command to the first integrated circuit and the second sleep-out command to the second integrated circuit.

4. A panel display device, comprising:
a display panel;
first and second drivers driving said display panel; and
a power supply line,
wherein said first driver includes:
  a first power supply circuit;
  a timing generation circuit generating a vertical synchronization signal defining each vertical synchronization period; and
  a first power supply control section controlling operation timing of said first power supply circuit;
wherein said second driver includes:
  a second power supply circuit; and
  a second power supply control section controlling operation timing of said second power supply circuit;
wherein said power supply line electrically connects outputs of said first and second power supply circuits,
wherein said first and second drivers are adapted to a sleep mode,
wherein an operation of said first power supply circuit is stopped when said first driver is placed into the sleep mode,
wherein an operation of said second power supply circuit is stopped when said second driver is placed into the sleep mode,
wherein said vertical synchronization signal is supplied to said first and second power supply control sections,
wherein said first power supply control section is configured to start the operation of said first power supply circuit in response to a start of a supply of said vertical synchronization signal after a first sleep-out command to get out of the sleep mode is supplied to said first driver, wherein said second power supply control section is configured to start the operation of said second power supply circuit in response to a start of a supply of said vertical synchronization signal after a second sleep-out command to get out of the sleep mode is supplied to said second driver, wherein said timing generation circuit starts supplying said vertical synchronization signal after a predetermined waiting time elapses after said first sleep-out command is supplied to said first driver.

5. The panel display device according to claim 4, wherein a time duration of said predetermined waiting time is equal to or longer than a time duration of one frame period defined as a cycle period of said vertical synchronization signal.

6. The panel display device according to claim 4, wherein said first power supply circuit includes a first output switch which connects the output of said first power supply circuit to a ground terminal when the operation of said first power supply circuit is stopped, and wherein said second power supply circuit includes a second output switch which connects the output of said second power supply circuit to a ground terminal when the operation of said second power supply circuit is stopped.

7. The panel display device according to claim 4,
wherein said first driver includes a first driving circuit operating on a first power supply voltage outputted from said first power supply circuit to drive said display panel, and
wherein said second driver includes a second driving circuit operating on a second power supply voltage outputted from said second power supply circuit to drive said display panel.

8. The panel display device according to claim 4, further comprising a host which supplies the first sleep-out command to the first driver and the second sleep-out command to the second driver.

9. A display panel driver configured to drive a display panel and adapted to a sleep mode, comprising:
a power supply circuit;
a timing generation circuit generating a vertical synchronization signal defining each vertical synchronization period; and
a power supply control section controlling operation timing of said power supply circuit,
wherein an operation of said power supply circuit is stopped when said display panel driver is placed into the sleep mode,
wherein said vertical synchronization signal is supplied to said power supply control section,
wherein said power supply control section is configured to start the operation of said power supply circuit in response to a start of a supply of said vertical synchronization signal after a sleep-out command to get out of the sleep mode is supplied to said display panel driver,
wherein said timing generation circuit starts supplying said vertical synchronization signal after a predetermined waiting time elapses after said sleep-out command is supplied to said display panel driver;
wherein the sleep-out command is supplied from a host to the display panel driver, and wherein the timing generation circuit externally outputs the vertical synchronization signal to a different display panel driver which is different than the host and configured to drive the display panel.

10. The display panel driver according to claim 9, wherein a time duration of said predetermined waiting time is equal to or longer than a time duration of one frame period defined as a cycle period of said vertical synchronization signal.

11. The display panel driver according to claim 9, wherein said power supply circuit comprises a plurality of power supply circuits, and wherein one power supply circuit of said plurality of power supply circuits assumes a master role to provide said vertical synchronization signal to remaining power supply circuits.

* * * * *